(12) United States Patent
Van Denend et al.

(10) Patent No.: US 7,500,432 B2
(45) Date of Patent: Mar. 10, 2009

(54) APPARATUS AND METHOD FOR BALANCING A PRINTING ROLLER HAVING AN IMAGE PRODUCING AREA ON ITS OUTER SURFACE

(76) Inventors: Mark E. Van Denend, 349 E. 36th St., Paterson, NJ (US) 07504; Ronnie Shemesh, 28 Dairy Rd., Greenwich, CT (US) 06830

( * ) Notice: Subject to any disclaimer, the term of this patent is extended or adjusted under 35 U.S.C. 154(b) by 396 days.

(21) Appl. No.: 11/260,978

(22) Filed: Oct. 28, 2005

(65) Prior Publication Data

US 2007/0095231 A1 May 3, 2007

(51) Int. Cl.
| B41F 33/00 | (2006.01) |
| B41F 1/34 | (2006.01) |
| B41N 6/00 | (2006.01) |
| B41C 3/08 | (2006.01) |
| B41L 5/16 | (2006.01) |
| B41L 15/14 | (2006.01) |
| B41L 49/00 | (2006.01) |
| G01M 1/00 | (2006.01) |

(52) U.S. Cl. .................... 101/483; 101/480; 101/401.1; 72/66; 700/729

(58) Field of Classification Search .............. 101/401.1, 101/480, 483, 484; 73/66, 487; 700/729
See application file for complete search history.

(56) References Cited

U.S. PATENT DOCUMENTS 3,482,075 A * 12/1969 Wilde .................... 219/121.68
3,538,298 A * 11/1970 Clapp et al. ............. 219/121.69
3,909,584 A * 9/1975 Brienza et al. ......... 219/121.68
4,258,246 A * 3/1981 Karube et al. ............. 219/121.8
4,773,019 A * 9/1988 Martin et al. ................ 700/279
5,627,762 A * 5/1997 Cameron et al. ............ 700/279
5,654,125 A * 8/1997 Fan et al. ..................... 430/306
5,797,186 A 8/1998 Bode
5,879,091 A 3/1999 De Ambrogio et al.
5,940,969 A 8/1999 Kuosmanen et al.
6,241,243 B1 6/2001 Ishida et al.
6,523,407 B1 * 2/2003 Breese ........................ 73/457
6,681,693 B2 1/2004 Kawada et al.
6,694,872 B1 2/2004 LaBelle et al.
6,776,095 B2 * 8/2004 Telser et al. ............... 101/401.1
2002/0020315 A1 2/2002 Siebolds et al.
2007/0131027 A1 * 6/2007 Otten .......................... 73/468

FOREIGN PATENT DOCUMENTS

WO    WO2005074106 A1 *  8/2005

* cited by examiner

*Primary Examiner*—Anthony H Nguyen
*Assistant Examiner*—Leo T Hinze
(74) *Attorney, Agent, or Firm*—Richard M. Goldberg

(57) ABSTRACT

Apparatus for balancing a printing roller having an image producing area thereon, includes a detector for detecting any unbalance of the printing roller during rotation thereof. A computer determines weight adjustments of the printing roller that are required to correct the unbalance, in response to the detection. A laser is controlled by the computer to remove material, in response to the determination, from at least one engraveable plate mounted on the outer surface of the printing roller or from the printing roller itself, in an area outside of the image producing area, in order to balance the printing roller.

21 Claims, 3 Drawing Sheets

APPARATUS AND METHOD FOR BALANCING A PRINTING ROLLER HAVING AN IMAGE PRODUCING AREA ON ITS OUTER SURFACE

BACKGROUND OF THE INVENTION

The present invention relates generally to printing rollers, and more particularly, is directed to an apparatus and method for balancing printing rollers.

Printing rollers in printing presses, particularly in flexographic printing presses, which have a printing plate mounted thereon, often become unbalanced. Specifically, even if the cylindrical roller on which the printing plate is mounted, is balanced, the plate may be positioned to one side of the printing roller, resulting in the printing roller becoming unbalanced. Further, after a printing plate is positioned on a printing roller, material is removed therefrom to create the image for a printing operation. However, this material removal is rarely uniform, that is, parts of the printing plate containing the image have more mass than other parts thereof. This offset of mass causes an out of balance situation.

Balance is important in a flexographic printing process. If the printing roller is out of balance, the printing roller will wobble. This, in turn, will result in a poorer quality and grade of the printed image. Further, this may result in skips in the printed image at higher speeds. To overcome this, it is often necessary to provide greater force or over impression during the printing operation, resulting in a poorer quality and grade of the printed image.

SUMMARY OF THE INVENTION

Accordingly, it is an object of the present invention to provide an apparatus and method for balancing a printing roller, that overcomes the aforementioned problem.

It is another object of the present invention to provide an apparatus and method for balancing a printing roller, that laser ablates a non-image producing area of the printing roller and/or engraveable plates added to the non-image producing area of the printing roller, to compensate for any unbalance in the printing roller.

It is still another object of the present invention to provide an apparatus and method for balancing a printing roller that is relatively inexpensive and easy to use and manufacture.

In accordance with an aspect of the present invention, apparatus for balancing a printing roller, includes a detector for detecting any unbalance of the printing roller during rotation thereof, and for producing an unbalance signal corresponding thereto. A control device determines weight adjustments of the printing roller that are required to correct the unbalance, in response to the unbalance signal, and produces a correction signal in response thereto. A device removes material, in response to the correction signal, from an area of the printing roller, in order to balance the printing roller.

In one embodiment, there is at least one engraveable plate mounted on the printing roller outside of an image producing area of the printing roller; and the device for removing material removes material, in response to the correction signal, from the at least one engraveable plate. In another embodiment, the device for removing material removes material, in response to the correction signal, from an outer surface of the printing roller.

In one embodiment, the printing roller includes an axial shaft, and the detector includes a dynamometer connected with the shaft.

In another embodiment, the detector includes a source of rays from the electromagnetic spectrum projected onto the outer surface, and a sensor that detects the rays that are reflected off of the outer surface. Preferably, the source of rays includes a laser. In this embodiment, a first driving device rotates the printing roller to expose different portions of the outer surface to the detector and the laser, and a second driving device provides relative movement in a lengthwise direction between the printing roller and at least one of the laser and the detector. As an added feature, a total indicated run-out detector detects variations in total indicated run-out of a surface of the printing roller, and the first-mentioned detector detects any unbalance of the printing roller in relation to detection of variations in the total indicated run-out of the surface of the printing roller. Preferably, the total indicated run-out detector detects variations in total indicated run-out of the surface of the printing roller at a speed slower than a normal printing speed of the printing roller prior to the first-mentioned detector detecting any unbalance of the printing roller. The first-mentioned detector and the total indicated run-out detector are preferably the same detector.

The detector, the control device and the device for removing material are adapted to operate substantially simultaneously until the detector fails to detect unbalance of the printing roller.

The device for removing material includes a laser which ablates an area of the printing roller, or at least one engraveable plate mounted on the printing roller outside of the image producing area, to remove material therefrom in order to balance the printing roller.

In accordance with another aspect of the present invention, apparatus for balancing a printing roller, includes a control device which calculates any imbalance of the printing roller from a weight and position of at least one element mounted on the printing roller, and/or an amount and position of any material removed from the printing roller or the at least one element, and which determines an area on the printing roller, and/or on at least one engraveable plate mounted on the printing roller outside of an image producing area of the printing roller, in response to the calculation. A device then removes material, in response to the determination by the control device, from the determined area of the printing roller, and/or the least one engraveable plate mounted on the printing roller outside of the image producing area, in order to balance the printing roller.

Again, the device for removing material includes a laser.

In accordance with still another aspect of the present invention, a method for balancing a printing roller, includes detecting any unbalance of the printing roller during rotation thereof, and producing an unbalance signal corresponding thereto. Weight adjustments of the printing roller that are required to correct the unbalance are then determined, in response to the unbalance signal, and a correction signal is produced in response thereto. Material is then removed, in response to the correction signal, in order to balance the printing roller.

In accordance with yet another aspect of the present invention, a method for balancing a printing roller, calculates any imbalance of the printing roller from a weight and position of the at least one element mounted on the printing roller, and/or an amount and position of any material removed from the printing roller or the at least one element. An area on the printing roller, and/or at least one engraveable plate mounted on the printing roller outside of the image producing area, is then determined, in order to balance the printing roller, in response to the calculation. Material is then removed, in response to the determination by the control device, in order to balance the printing roller, from the determined area of the printing roller, and/or the least one engraveable plate mounted on the printing roller outside of the image producing area.

In accordance with yet another aspect of the present invention, a printing roller includes a cylindrical roller; an image producing area on the cylindrical roller; and at least one engraveable plate mounted on the printing roller outside of the image producing area.

The above and other objects, features and advantages of the invention will become readily apparent from the following detailed description thereof which is to be read in connection with the accompanying drawings.

DETAILED DESCRIPTION

Figure 1:
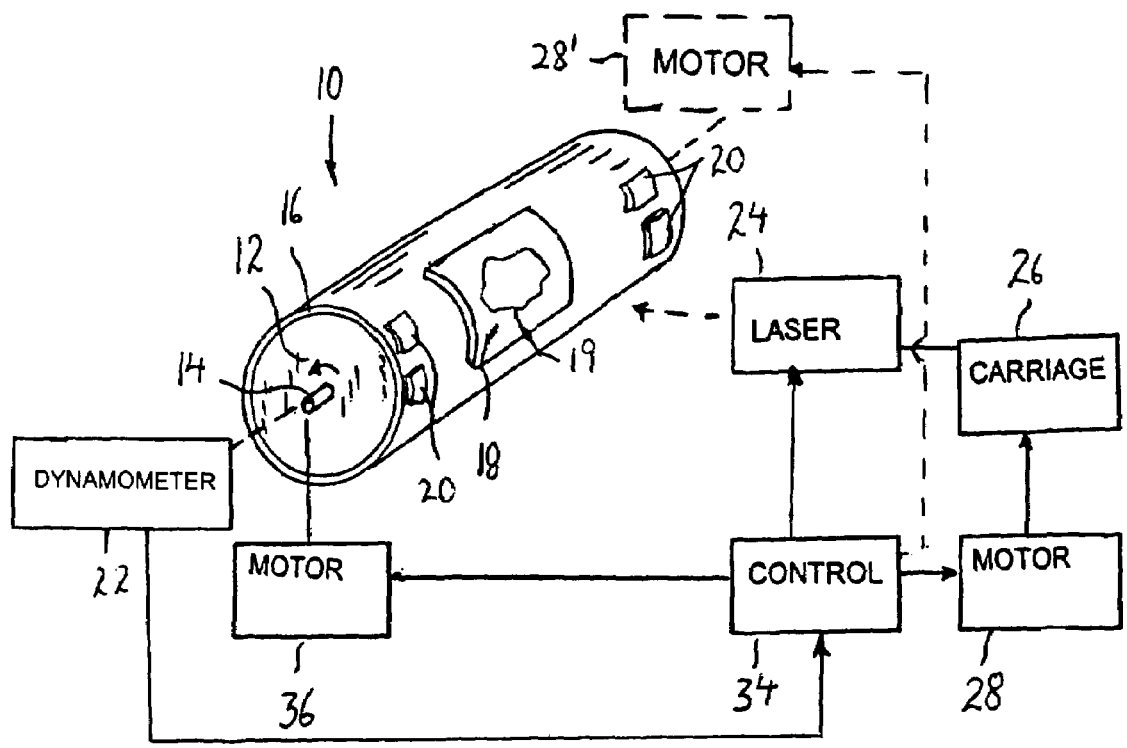
FIG. 1 is perspective view and block diagram of a first embodiment of the present invention.
Figure 2:
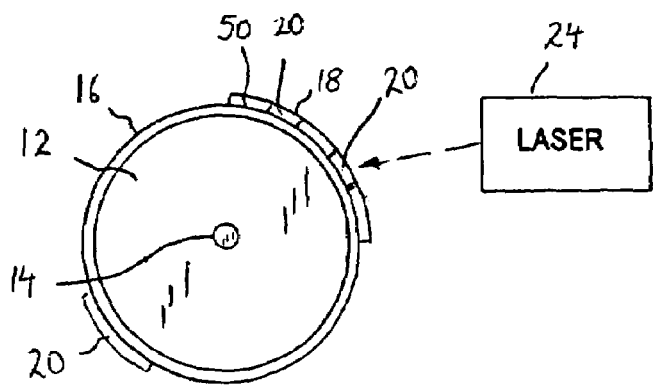
FIG. 2 is an end elevational view of the printing roller with printing plate of FIG. 1.

Referring to the drawings in detail, and initially to FIGS. 1 and 2 thereof, a printing roller 10 for a printing press, such as a flexographic printing press, includes a cylindrical roller 12 mounted on an axial shaft 14. Cylindrical roller 12 can also include an annular sleeve 16 mounted thereon, although this is not required. At least one printing plate 18 can be mounted on an outer surface of sleeve 16 or directly on cylindrical roller 12, although printing plates 18 are also not required. Each printing plate 18 will be engraved in order to produce an engraved image thereon which is used during a printing operation, as is well known in the art. Alternatively, printing plate 18 can be eliminated and the engraved image can be formed directly on cylindrical roller 12, sleeve 16 and/or a coating on cylindrical roller 12.

As defined in the claims herein, reference to a "printing roller" means a roller having an outer surface with an image producing area which has or is adapted to have a reverse image used for a printing operation. Thus, for example, and without limitation to further arrangements, reference to a printing roller can include:

a) cylindrical roller 12 having an image producing area in which an engraved image used for printing is formed;
b) cylindrical roller 12 having an image producing area in which an engraved image has yet to be formed, but in which the engraved image will be later formed;
c) cylindrical roller 12 with a coating on the outer surface thereof, and with an image producing area in which an engraved image used for printing is formed in the coating;
d) cylindrical roller 12 with a coating on an outer surface thereof, and with an image producing area in which an engraved image has yet to be formed, but in which the engraved image will later be formed in the coating;
e) cylindrical roller 12 with sleeve 16 on an outer surface thereof, and with an image producing area in which an engraved image used for printing is formed in sleeve 16;
f) cylindrical roller 12 with sleeve 16 on an outer surface thereof, and with an image producing area in which an engraved image has yet to be formed, but in which the engraved image will later be formed in sleeve 16;
g) cylindrical roller 12 with sleeve 16 on an outer surface thereof and with a coating on the outer surface of sleeve 16, and with an image producing area in which an engraved image used for printing is formed in the coating;
h) cylindrical roller 12 with sleeve 16 on an outer surface thereof and with a coating on the outer surface of sleeve 16, and with an image producing area in which the engraved image has yet to be formed, but in which the engraved image will later be formed in the coating;
i) cylindrical roller 12 with an image producing area thereon, and at least one printing plate 18 mounted in the image producing area;
j) cylindrical roller 12 with an image producing area thereon in which at least one printing plate 18 is adapted to be mounted, but is not yet mounted.

However, as discussed above, printing roller 10, which can rotate at high speeds of, for example, 2500 rpm, can become unbalanced during rotation thereof, resulting in an uneven printed image.

As also recited in the following examples and the subsequent claims, a detector for detecting the unbalance of a printing roller may be a dynamometer, an accelerometer, a piezoelectric device, a laser or other light source and detector device, or any such other measuring apparatus which can determine weight unbalance in a body rotating about an axis. The control device may be a computer or other such data collection and analysis device which receives an input, performs a particular operation upon such input to obtain a desired correction characteristic and outputs the correction characteristic to assimilate the input towards a desired value. A device for removing material may be a laser such as a YAG laser or $CO_2$ laser or other suitable cutting tool such as a router, grinding stone or device, or saw for removing material from a prescribed surface of an object.

One example of the present invention will now be discussed in relation to FIGS. 1 and 2 in which printing roller 10 has sleeve 16 mounted thereon, and also has an image producing area 19 thereon, with an engraved printing plate 18 mounted in image producing area 19, although it will be appreciated that the present invention is not limited to this example. As shown in FIGS. 1 and 2, engraveable plates 20 are also mounted on sleeve 16 outside of image producing area 19. It will be appreciated that plates 20 can be provided in other areas than those shown, which other areas are outside of image producing area 19. For example, plates 20 can be provided at a center section of the outer surface on sleeve 16, adjacent to, diametrically opposite to, etc. printing plate 18.

A dynamometer 22, which measures force, is connected with shaft 14 of printing roller 10 to determine any unbalance of printing roller 10 during the rotation. Specifically, dynamometer 22 measures the force created by the out of balance printing roller 10. In order to accomplish this, printing roller 10 must be rotating at a sufficiently high speed to create the out of balance force. A normal operating speed is sufficient to create this out of balance force.

The output of dynamometer 22 is supplied to a control device 34, which can be a computer, that determines the unbalance, and specifically, determines how and where to remove material from plates 20. Specifically, control device 34 supplies a signal to a laser 24, such as a $CO_2$ laser, a YAG laser or any other suitable laser, which can also be movable along a carriage 26 by a motor 28, in order to ablate engraveable weights 20 so as to remove material therefrom in specific areas and which also reduces the weight thereof in these areas, resulting in a balancing of printing cylinder 10.

In this regard, engraveable weights 20 are preferably made of a material that permits such laser ablating, including but not limited to any flexible substrate made from a photopolymer, vulcanized rubber, a thermal polymer, or any other suitable material, and including but not limited to the materials discussed in U.S. Pat. Nos. 5,804,353; 6,551,759; 6,551,762; 6,159,659; 6,627,385; 6,776,095; 6,794,115; 6,737,216; 6,178,852; and 6,797,455, the entire disclosures of which are incorporated herein by reference.

Laser 24 is preferably mounted on movable carriage 26 for movement along the axial, lengthwise direction of printing roller 10 by means of drive motor 28. Alternatively, as shown by dashed lines in FIG. 1, a drive motor 28' can be used to move printing roller 10 in the lengthwise direction thereof relative to laser 24 which is stationary. For example, a servo operated drive motor 28' can be used for such purpose. Still further, both drive motor 28 and drive motor 28' can be used in conjunction with each other. In other words, it is only important that there be relative lengthwise movement of laser 24 and printing roller 10 relative to each other. Alternatively, both printing roller 10 and laser 24 can be stationary, and laser 24 can be controlled to scan in the lengthwise direction of printing roller 10. If printing roller 10 is too long for such an operation, a plurality of lasers 24 can be mounted in spaced relation along the lengthwise direction of printing roller 10 for such scanning operation.

In order to control laser 24 to correctly ablate engraveable weights 20, control device 34 controls the ablation and relative movement of laser 24 and printing roller 10. Control device 34 controls drive motor 28 and/or drive motor 28' to control relative lengthwise movement of printing roller 10 and laser 24 during the ablation operation, and also controls a separate drive motor 36 to rotate cylindrical roller 12 by small increments. In this manner, engraveable plates 20 are laser ablated in order to remove material therefrom in specific areas determined by control device 34, so as to dynamically balance printing roller 10. Alternatively, as discussed above, laser 24 can be stationary and carriage 26 and drive motor 28' can be eliminated, and in such case, control device 34 would control stationary laser 24 to scan across engraveable plates 20 in the lengthwise direction thereof.

It will be appreciated that removal of material to balance printing roller 10 can occur other than with engraveable plates 20. For example, if sleeve 16 is mounted on cylindrical roller 12, sleeve 16 can be ablated in selected areas to remove material therefrom and provide such dynamic balance. As another alternative, if sleeve 16 is not provided, selected areas of cylindrical roller 12 can be ablated to remove material therefrom and provide such dynamic balance. As a further modification, a coating can be applied to cylindrical roller 12 and/or sleeve 16, with the coating being ablated in the selected areas to dynamically balance printing roller 10. In other words, it is important to remove material from selected areas of printing roller 10, such as from cylindrical roller 12, sleeve 16, a coating or engraveable plates 20, or any combination of these, normally outside of the image producing area, in order to dynamically balance printing roller 10.

Figure 3:
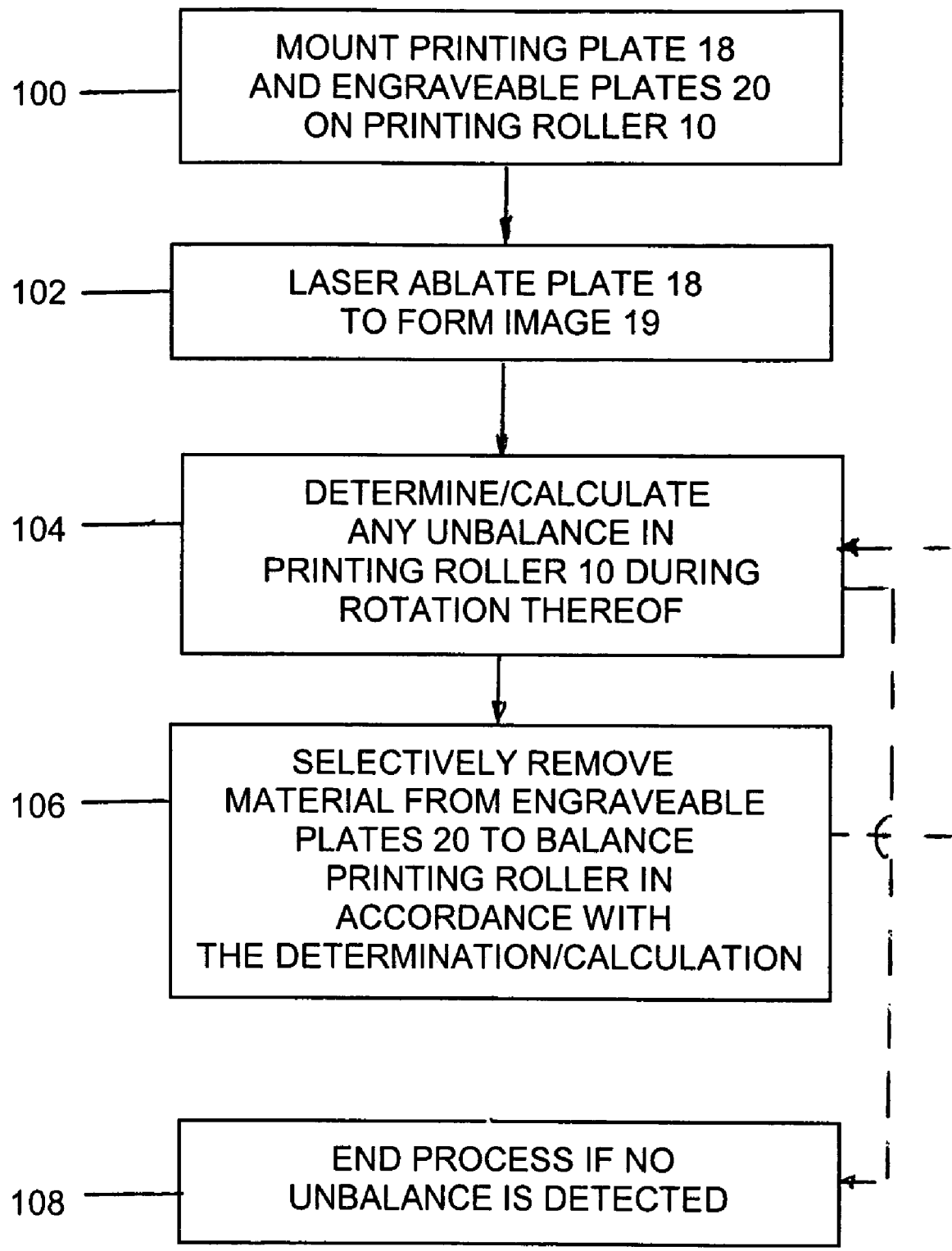
FIG. 3 is a flow chart diagram describing the operation according to the present invention.

In operation, and referring to FIG. 3, in step 100, printing plate 18 is mounted on printing roller 10 within image producing area 19, and engraveable plates 20 are mounted on printing roller 10 outside of image producing area 19, that is, either directly on cylindrical roller 12 or on sleeve 16. Then, in step 102, laser 24 is controlled by control device 34 to laser ablate printing plate 18 to form an engraved image thereon. As a result, the engraved image is raised up relative to the remainder of printing plate 18 for use in a printing operation. Then, in step 104, any dynamic unbalance in printing roller 10 is determined by dynamometer 22 during rotation of printing roller 10, which produces an unbalance signal. Thereafter, control device 34, in response to the output unbalance signal from dynamometer 22, determines the areas of engraveable plates 20 in which material is to be removed in order to dynamically balance printing roller 10, and by a correction signal, controls laser 24, carriage 26 and motors 28, 28' and 36 so that this material is selectively removed from these areas of engraveable plates 20 in order to balance printing roller 10.

It will be appreciated that the ablation by laser 24 and the detection by dynamometer 22 and control device 34 preferably occur substantially simultaneously, so that this correction occurs at the same time that dynamometer 22 is detecting any unbalance, although this is not a requirement of the present invention. Thus, after step 106 is performed, the process returns back to step 104 to again determine if there is any unbalance in printing roller 10. This iteration process will continue, all during rotation of printing roller 10, until no unbalance in printing roller 10 is detected or unbalance falls within an acceptable range.

As a variation, even if printing roller 10 is detected as being balanced, the process can still return to step 104 to determine any out of balance condition at a different rotational speed of printing roller 10. However, it is primarily important that the balancing occur at the rotational speed at which printing roller 10 will rotate during a normal printing operation.

Figure 4:
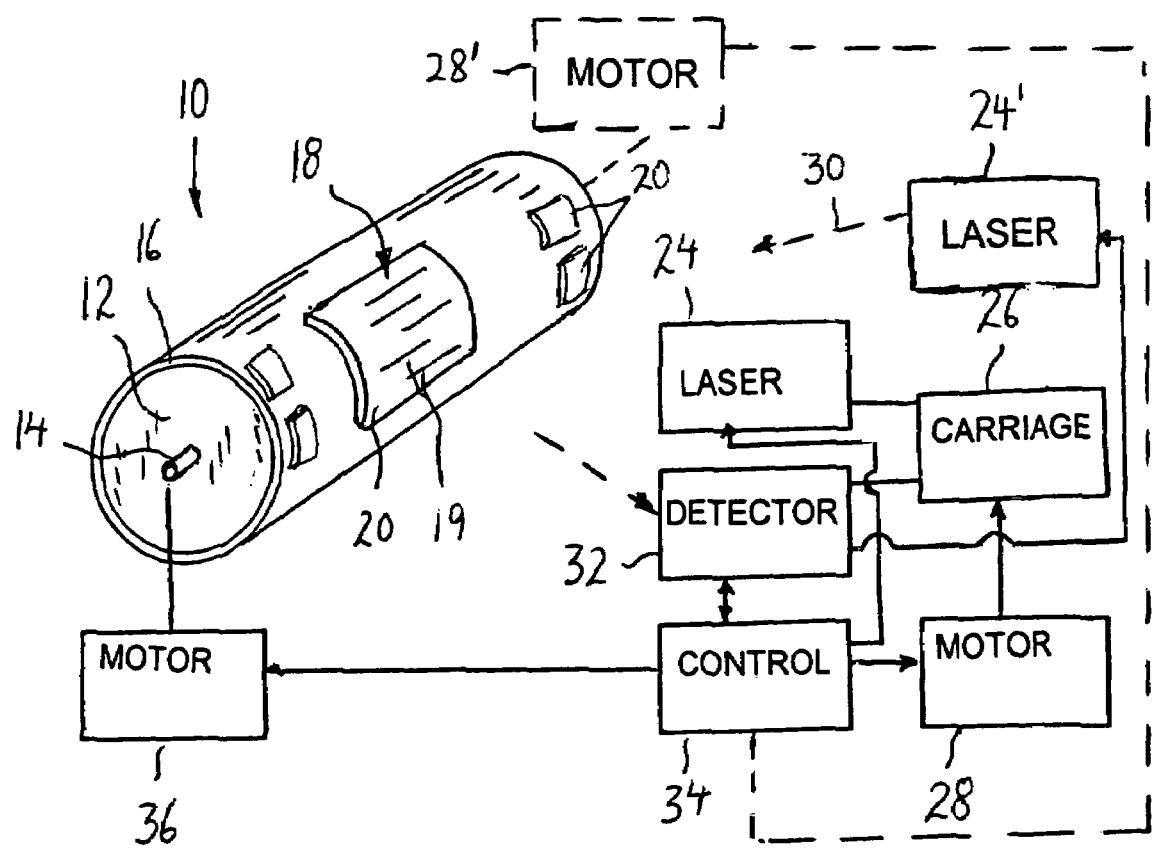
FIG. 4 is perspective view and block diagram of a second embodiment of the present invention.

Referring now to FIG. 4, there is shown a second embodiment of the present invention, in which like elements are identified by the same numerals, and a description of the common elements is not provided for the sake of brevity.

Specifically, in FIG. 4, instead of using a dynamometer to detect any out of balance of printing roller 10, a separate laser 24' focuses a beam of light 30 that is bounced off the outer surface of cylindrical roller 12 or sleeve 16, and is received by a detector 32, such as an optical detector, that produces the unbalance signal. Alternatively, detector 32 can provide its own source of light against cylindrical roller 12 or sleeve 16, which is then bounced off the same and received by detector 32. For example, detector 32 can include a conventional photodiode which directs light against cylindrical roller 12 or sleeve 16, and a photodetector which detects the light reflected back therefrom. Generally, any signal waves in the electromagnetic spectrum can be used for such detection operation, which include, without limitation visible light rays, infrared rays, laser light, etc. A signal corresponding to this detection operation is then provided by detector 32 to control device 34 to control removal of material from engraveable plates 20. Thus, laser 24' and detector 32 are used in the detection step 104 of FIG. 3, rather than using dynamometer 22.

With this embodiment, laser 24' and detector 32 can be used to detect unbalance at different rotational speeds (rpm) of printing roller 10. However, as discussed above, it is primarily important that the balancing occur at the rotational speed at which printing roller 10 will rotate during a normal printing operation.

Thus, laser 24' and detector 32 detect any out of balance movement of printing roller 10. The above process of removing material from engraveable plates by laser 24 during the detection operation, continues until the out of balance movement ceases or falls within an acceptable range. Preferably, this should be performed at the minimum full printing speed. For example, many printing machines run at a maximum of 2000 feet/second. This means that the rotational speed of printing roller 10 would be $2000/2\Pi r$ rpm, where r is the radius of printing roller 10.

As a further alternative, more than one laser 24' and detector 32 can be used. For example, one laser 24' and detector 32 pair can be used at each end of printing roller 10, and one laser 24' and detector 32 pair can be used at the center of printing roller 10.

The second embodiment has the advantage of balancing the entire printing roller 10, and not just at an end or at the center thereof.

In the second embodiment, it is also preferred to detect cylindricity of printing roller 10 prior to performing the balancing operation. In this regard, the teachings of applicant's prior pending U.S. patent application Ser. No. 11/143,163, filed Jun. 2, 2005, the entire disclosure of which is incorporated herein by reference, can be used to detect any variations in cylindricity. In other words, laser 24' and detector 32 detect any variations in the radii at different positions of the raised surface of printing roller 10, thereby providing variations in the cylindricity thereof. This detection preferably takes place at slower speeds in the range of 10 to 100 rpm, so that any unbalance or wobble of printing roller 10 does not affect this measurement.

In this regard, detector 32 detects variations in at least one of total indicated run-out and taper in a surface of the printing roller, which determine cylindricity thereof.

Then, any variations in cylindricity are used as a base when detecting an unbalance in printing roller 10 rotating at higher speeds of, for example, 2,000 rpm, that is, the detection looks for any deviation from this base.

A third embodiment of the present invention uses the apparatus of FIG. 1, but without dynamometer 22. Specifically, in accordance with the third embodiment, control device 34 controls ablation of cylindrical roller 12, sleeve 16, a coating thereon, or printing plate 18 to form an engraved image, in accordance with input instructions, as is well known in the art. However, in accordance with this embodiment, control device 34, based on these input instructions, calculates the amount of material that has been removed by this ablation operation, using any of the factors of the weight, weight distribution, size and/or position of the engraved printing plate 18, and then determines the areas in the remainder of printing roller 10 that need to be ablated in order to compensate for this removal of material. It will be appreciated that, for purposes of this third embodiment, it is assumed that printing roller 10 is in balance prior to removal of material forming image producing area 19. Thus, material in an area outside of image producing area 19, for example, from engraveable plates 20, from cylindrical roller 12, from sleeve 16, from a coating thereon, or any combination thereof, is removed in accordance with the calculations, in order to balance printing roller 10.

For example, in this third embodiment, assuming that printing roller 10 is in balance, then the center of mass thereof should be the geometric center. However, where there are other elements, such as sleeve 16, printing plates 18, engraveable plates 20, and any coating, the center of mass will change. Thus, if mass is removed from printing roller 10, then the center of the net mass M will also change. As a result, the calculation then determines further ablation that normally is performed outside of image producing area 19, in order to bring the center of mass back to the same position the geometric center discussed above when assuming that printing roller 10 was in balance, in order to balance printing roller 10.

If printing roller 10 is in balance prior to ablation, to find the center of gravity of printing roller 10, the mass $m_i$ of the removed material must be known and the $x_i$, $y_i$ and $z_i$ coordinates of the center of gravity of each area of the material removed must be known. The equation for the $X_T$, $Y_T$ and $Z_T$ coordinates of the total center of gravity of printing roller 10 after the material is removed is:

$$X_T = \frac{\sum_{1}^{n} x_i m_i}{\sum_{1}^{n} m_i}$$

$$Y_T = \frac{\sum_{1}^{n} y_i m_i}{\sum_{1}^{n} m_i}$$

$$Z_T = \frac{\sum_{1}^{n} z_i m_i}{\sum_{1}^{n} m_i}$$

where $m_i$ are the masses of the particular segments removed, and $x_i$, $y_i$ and $z_i$ are the coordinates of the centers of gravity of the particular segments.

For example, if a weight of 20 grams centered around a point 100 mm from the end of printing roller 10 and at zero degrees is removed, the center of mass for printing roller 10 is shifted from the geometrical center. By removing 20 grams centered 100 mm from the end and at 180 degrees, or alternatively, by removing 20 grams centered 100 mm from the end and at 120 degrees and 20 grams centered 100 mm from the end and at 240 degrees, the center of mass will be the same as the geometric center.

As another example, in this third embodiment, if engraveable plates 20 are provided, material can be removed therefrom to make the center of mass the same as the geometrical center of printing roller 10.

Alternatively, as another example, if engraveable plates 20 are not provided, such material can be removed in an amount from cylindrical roller 12, sleeve 16 and/or a coating thereon to make the center of mass the same as the geometrical center.

As a further example, the center of the removed mass from printing plate 18 can be determined, and an additional amount of material can be removed to make the center of mass the same as the geometrical center of printing roller 10. In this example, only a portion of printing plate 18 would be positioned in image producing area 19, and other parts of printing plate 18 which are not part of the engraved image, would be outside of image producing area 19.

It will be appreciated that removal of material to balance printing roller 10 is normally outside of image producing area 19, but can also be within image producing area 19. For example, this could occur where image producing area 19 includes the entire circumference of printing roller 10.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. Apparatus for balancing a printing roller, said apparatus comprising:

at least one engraveable plate adapted to be mounted on said printing roller in an area outside of a printing region;

a detector for detecting any unbalance of said printing roller during rotation thereof, and for producing an unbalance signal corresponding thereto;

a control device for determining weight adjustments of said printing roller to correct said unbalance, in response to said unbalance signal, and for producing a correction signal in response thereto; and a laser for removing material, in response to said correction signal, from said at least one engraveable plate on said printing roller, in order to balance the printing roller.

2. Apparatus according to claim 1, wherein said printing roller includes an axial shaft, and said detector includes a dynamometer connected with said shaft.

3. Apparatus according to claim 1, wherein said detector includes a source of rays from the electromagnetic spectrum projected onto said outer surface, and a sensor that detects said rays that are reflected off of said outer surface.

4. Apparatus according to claim 3, wherein said source of rays includes a laser.

5. Apparatus according to claim 3, further comprising a first driving device which rotates said printing roller to expose different portions of said outer surface to said detector and said laser.

6. Apparatus according to claim 5, further comprising a second driving device which provides relative movement in a lengthwise direction between said printing roller and at least one of said laser and said detector.

7. Apparatus for balancing a printing roller, said apparatus comprising:

a detector for detecting:

variations in total indicated run-out of a surface of the printing roller, and any unbalance of said printing roller in relation to detection of variations in the total indicated run-out of the surface of the printing roller during rotation thereof, and for producing an unbalance signal corresponding thereto, said detector including a source of rays from the electromagnetic spectrum projected onto said outer surface, and a sensor that detects said rays that are reflected off of said outer surface;

a control device for determining weight adjustments of said printing roller to correct said unbalance and to ensure cylindricity of the printing roller, in response to said unbalance signal, and for producing a correction signal in response thereto; and a device for removing material, in response to said correction signal, from said printing roller, in order to balance the printing roller and to ensure cylindricity of the printing roller.

8. Apparatus according to claim 7, wherein said detector detects variations in total indicated run-out of the surface of the printing roller at a speed slower than a normal printing speed of said printing roller prior to said detector detecting any unbalance of said printing roller.

9. Apparatus according to claim 7, wherein said detector includes a first detector which detects any unbalance of said printing roller and a second total indicated run-out detector.

10. Apparatus for balancing a printing roller having an engraved image on one of the printing roller and a printing elate mounted on the printing roller, said apparatus comprising:

a control device which:

calculates any imbalance of the printing roller in response at least to the engraved image, without reference to any detection of imbalance of the printing roller by a sensor, from at least one of:

a weight and position of at least one element mounted on the printing roller, and an amount and position of any material removed from the printing roller or the at least one element, and determines an area on at least one of the following from which material is to be removed in order to balance the printing roller, in response only to the calculation:

said printing roller, and at least one engraveable plate mounted on said printing roller outside of an image producing area of said printing roller; and a device for removing material, in response only to said determination by said control device, from at least one of the following in order to balance the printing roller:

said determined area of said printing roller, and the least one engraveable plate mounted on said printing roller outside of said image producing area.

11. Apparatus according to claim 10, wherein said device for removing material includes a laser which ablates at least one of the following to remove material therefrom in order to balance the printing roller:

said determined area of said printing roller, and the least one engraveable plate mounted on said printing roller outside of said image producing area.

12. A method for balancing a printing roller, said method comprising the steps of:

mounting at least one engraveable plate on said printing roller in an area outside of a printing region;

detecting any unbalance of said printing roller during rotation thereof, and producing an unbalance signal corresponding thereto;

determining weight adjustments of said printing roller to correct said unbalance, in response to said unbalance signal, and producing a correction signal in response thereto; and removing material, in response to said correction signal, from said at least one engraveable plate on said printing roller by laser ablation, in order to balance the printing roller.

13. A method according to claim 12, wherein said step of detecting includes the step of using a dynamometer connected with an axial shaft of said printing roller to detect any unbalance of the printing roller.

14. A method according to claim 12, wherein said step of detecting includes the step of projecting a source of rays from the electromagnetic spectrum onto said outer surface, and detecting said rays that are reflected off of said outer surface.

15. A method according to claim 14, wherein said step of projecting includes the step of projecting a laser light onto said outer surface.

16. A method according to claim 14, further comprising the step of rotating said printing roller to expose different portions of said outer surface to said detector and said laser.

17. A method according to claim 16, further comprising the step of providing relative movement in a lengthwise direction between said printing roller and at least one of said laser and said detector.

18. A method for balancing a printing roller, said method comprising the steps of:

detecting variations in total indicated run-out of a surface of the printing roller, detecting any unbalance of said printing roller in relation to detection of variations in the total indicated run-out of the surface of the printing roller during rotation thereof, and producing an unbalance signal corresponding thereto, said step of detecting any unbalance includes the step of projecting a source of rays from the electromagnetic spectrum onto said outer surface, and detecting said rays that are reflected off of said outer surface;

determining weight adjustments of said printing roller to correct said unbalance and to ensure cylindricity of the printing roller, in response to said unbalance signal, and producing a correction signal in response thereto; and removing material, in response to said correction signal, in order to balance the printing roller and to ensure cylindricity of the printing roller.

19. A method according to claim 18, wherein said step of detecting variations in total indicated run-out occurs at a speed slower than a normal printing speed of said printing roller prior to said step of detecting any unbalance of said printing roller.

20. A method for balancing a printing roller having an engraved image on one of the printing roller and a printing plate mounted on the printing roller, said method comprising the steps of:

calculating any imbalance of the printing roller in response at least to the engraved image, without reference to any detection of imbalance of the printing roller by a sensor, from at least one of:

a weight and position of at least one element mounted on the printing roller, and an amount and position of any material removed from the printing roller or the at least one element;

determining an area on at least one of the following from which material is to be removed in order to balance the printing roller, only in response to the calculation:

said printing roller, and at least one engraveable plate mounted on said printing roller outside of an image producing area of said printing roller; and removing material, only in response to said determination by said control device, from at least one of the following in order to balance the printing roller:

said determined area of said printing roller, and the least one engraveable plate mounted on said printing roller outside of said image producing area.

21. A method according to claim 20, wherein said step of removing material includes the step of ablating at least one of the following with a laser to remove material therefrom in order to balance the printing roller:

said determined area of said printing roller, and the least one engraveable plate mounted on said printing roller outside of said image producing area.

* * * * *